(12) United States Patent
Dropps et al.

(10) Patent No.: US 11,188,480 B1
(45) Date of Patent: Nov. 30, 2021

(54) SYSTEM AND METHOD FOR CACHE DIRECTORY TCAM ERROR DETECTION AND CORRECTION

(71) Applicant: HEWLETT PACKARD ENTERPRISE DEVELOPMENT LP, Houston, TX (US)

(72) Inventors: Frank R. Dropps, Eagan, MN (US); Thomas Edward McGee, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/930,263

(22) Filed: May 12, 2020

(51) Int. Cl.
| | | |
|---|---|---|
| *G06F 13/00* | (2006.01) | |
| *G06F 12/128* | (2016.01) | |
| *G06F 12/123* | (2016.01) | |
| *G06F 9/30* | (2018.01) | |
| *G06F 12/0815* | (2016.01) | |

(52) U.S. Cl.
CPC ........ *G06F 12/128* (2013.01); *G06F 9/30047* (2013.01); *G06F 12/0815* (2013.01); *G06F 12/123* (2013.01); *G06F 2212/1021* (2013.01)

(58) Field of Classification Search
CPC .. G06F 12/128; G06F 9/30047; G06F 12/123; G06F 12/0815; G06F 2212/1021
See application file for complete search history.

(56) References Cited

U.S. PATENT DOCUMENTS

| | | | | |
|---|---|---|---|---|
| 6,330,643 B1* | 12/2001 | Arimilli | .............. | G06F 12/0811 711/141 |
| 7,185,172 B1* | 2/2007 | Mick, Jr. | ........... | G06F 16/90339 711/206 |
| 2005/0138264 A1* | 6/2005 | Goto | ................... | G06F 12/0893 711/3 |
| 2014/0181420 A1* | 6/2014 | Wicki | ................ | G06F 12/0831 711/146 |
| 2019/0236011 A1* | 8/2019 | Dropps | ............... | G06F 12/0811 |
| 2020/0349077 A1* | 11/2020 | Dropps | ................ | G06F 12/124 |
| 2020/0356483 A1* | 11/2020 | Dropps | ............... | G06F 12/0813 |

* cited by examiner

*Primary Examiner* — Jing-Yih Shyu
(74) *Attorney, Agent, or Firm* — Hewlett Packard Enterprise Patent Department

(57) ABSTRACT

Systems and methods are provided for addressing die are inefficiencies associated with the use of redundant ternary content-addressable memory (TCAM) for facilitating error detection and correction. Only a portion of redundant TCAMs (or portions of the same TCAM) are reserved for modified coherency directory cache entries, while remaining portions are available for unmodified coherency directory cache entries. The amount of space reserved for redundant, modified coherency directory cache entries can be programmable and adaptable.

18 Claims, 10 Drawing Sheets

SRAM 305

| # | Valids | State Info. | Sharing Vector / Ownership |
|---|---|---|---|
| | | State Information 310 | |
| 1 | 1111 | Shared | Sharing Info. |
| 2 | 0000 | Invalid | |
| 3 | 0011 | Exclusive | Ownership Info. |
| 4 | 0010 | Exclusive | Ownership Info. |

FIG. 3C

SYSTEM AND METHOD FOR CACHE DIRECTORY TCAM ERROR DETECTION AND CORRECTION

BACKGROUND

In symmetric multiprocessing (SMP) systems, multiple processors are configured to share a common operating system and memory resources. A single copy of the operating system manages all of the processor in the system. SMP is also referred to as "tightly coupled multiprocessing" because all of the processor are connected via a shared bus or network and have access to the same shared memory resource. The throughput of an SMP system is higher than single-processor systems as all the processors are running in parallel. Moreover, reliability is increased. If a processor socket were to fail (e.g., a short on that processor's board) that processor's workload can be distributed amongst the other sockets, whereas if the processor in a single-processor fails, the system fails.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3C is a schematic representation of an example SRAM in accordance with one embodiment of the technology disclosed herein.

Figure 1:
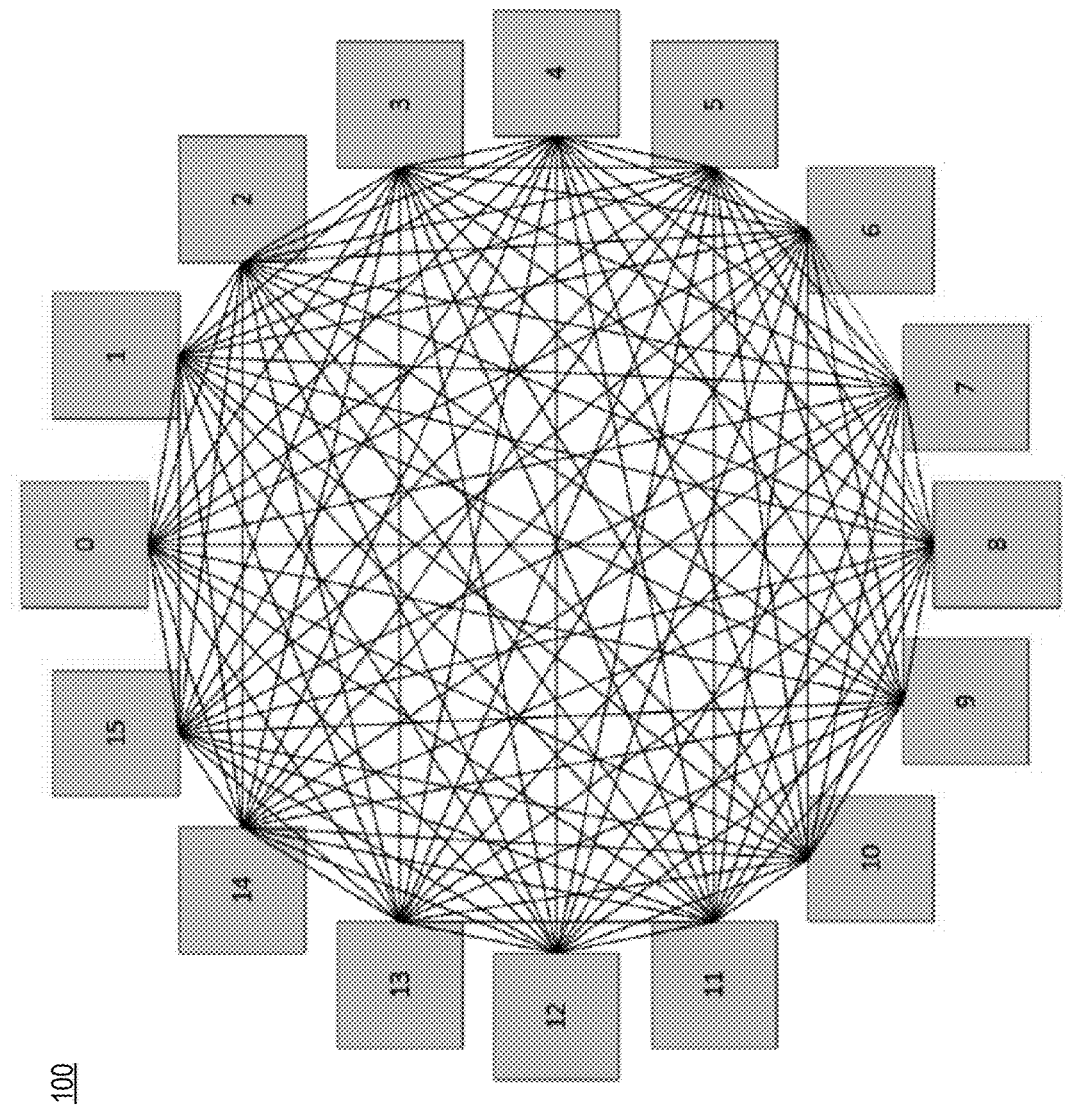
FIG. 1 is an example architecture in accordance with embodiments of the technology disclosed herein.

The figures are not exhaustive and do not limit the present disclosure to the precise form disclosed.

DETAILED DESCRIPTION

Non-uniform memory access (NUMA) is a memory design for SMP systems. Generally, a NUMA architecture includes a plurality of nodes interconnected over an SMP bus or network. Each node itself is a small-scale SMP, comprising several processor sockets and associated memory interconnected amongst themselves, with the memory within the node being shared by all of the processor sockets. Memory within a node may be considered local memory to the processors of the node, while memory of other nodes may be considered remote memory. Node controllers within each node enable the processor sockets to access remote memory within the system. A node controller may be considered an advanced memory controller, managing access to some or all of the local memory and the node's processor sockets access to remote memory.

Because of the manner in which memory is implemented, each of the node controllers participate in the cache coherency protocol for the system. Cache coherency can entail ensuring uniformity in data blocks, meaning that any variable that is to be used has a consistent value across all local caches. In this regard, a coherency directory may include entry information to track the state and ownership of each memory block that may be shared between processors in a multiprocessor shared memory system. Because a coherency directory may be too large to be stored on a node controller, the coherency directory can be stored in host memory, and a node controller may use a coherency directory cache for fast access/reduced bandwidth impact on a processor.

To the above, a coherency directory cache may be described as a component that stores a subset of the coherency directory entries providing for faster access and increased data bandwidth. For directory-based coherence, the coherency directory cache may be used by a node controller to manage communication between different nodes of a computer system or different computer systems. In this regard, the coherency directory cache may track the status of each cache block (or cache line) for the computer system or the different computer systems. For example, the coherency directory cache may track which of the nodes of the computer system or of different computer systems are sharing a cache block.

A coherency directory cache may include information related to a plurality of memory blocks. The size of these memory blocks may be defined for ease of implementation to be the same as system cache lines for a computer system. These cache line sized memory blocks for discussion clarity may be referred to as cache lines. The cache line information may identify a processor (or another device) at which the cache line is stored in the computer system (or different computer systems). The coherency directory and coherency directory cache may include a coherency state and ownership information associated with each of the system memory cache lines. As the number of cache lines increases, the size of the coherency directory and likewise the coherency directory cache may similarly increase. For performance reasons, the increase in the size of the coherency directory cache may result in a corresponding increase in usage of a die area associated with the coherency directory cache. In some systems, ternary content-addressable memory (TCAM) is used to implement a coherency directory cache, where TCAMs hold tags to be searched, and where TCAMs are under pinned by static random-access memory (SRAM). As a result, error detection and correction is used to maintain availability, which is currently accomplished through duplication, i.e., two TCAMs that store duplicate/redundant TCAM tag entries. The use of two TCAMs for error detection and correction is also die area-inefficient.

Accordingly, various embodiments are directed to providing TCAM duplication only when necessary to protect modified coherency directory cache entries. In particular, some number of TCAM entries are reserved for use as a redundant TCAM configuration.

In one embodiment, the number of redundant TCAM entries can be programmable and use the same row in both TCAMs. The use of the same/corresponding rows between redundant entry areas of the TCAMs allows for easier interrogation of the second TCAM to determine which of the first or second TCAM is in error when only one hit/match occurs when there should have been two (described in greater detail below). Additionally, when there is a match in two TCAMs, the row number/address can act as a direct pointer to the underpinning SRAM location. In accordance with another embodiment, writing redundant/modified entries to the same row in each TCAM is not necessary. For example, a circuit can be constructed that uses, e.g., a single TCAM and that expects a match in both an upper half/portion and a lower half/portion of the TCAM to provide redundancy for modified entries. Despite involving more write operations (four writes) to a single TCAM versus two writes to each of two TCAMs in parallel, the same die size efficiency can be realized. The remaining TCAM capacity can hold non-modified entries. To manage TCAMs configured in this manner, each TCAM is treated/managed as two separate cache areas (one for modified entries, one for non-modified entries). Each cache area maintains separate least-recently used (LRU) linked lists to identify entries for eviction.

In another embodiment, entry assignment can be free-flowing, where two TCAM entries are evicted when needed for redundant entry storage of modified entries. In this embodiment, dynamic allocation of entries to a TCAM is contemplated, where there need not be any "hard" divisions that partition TCAM space into redundant entry and non-redundant entry areas. Accordingly, when redundant entries are to be stored, two free entry locations are freed (since redundant entries are stored in two TCAMs). If an LRU entry is a redundant entry, evicting it results in the two entry locations. If an LRU entry is a non-redundant entry, an additional entry can be evicted to obtain the additional entry space. In another embodiment, a modified entry can replace a non-redundant/non-modified LRU entry by performing a write-back of the modified information to host/system memory. If evicting a unmodified entry, it can be silently dropped in.

FIG. 1 illustrates an example architecture 100 in accordance with embodiments of the present disclosure. Example architecture 100 is provided for illustrative purposes only, and should not be interpreted as limiting the scope of the subject matter disclosed herein to architecture 100. A person of ordinary skill in the art would know that embodiments of the technology disclosed herein are applicable to any multiprocessing system with shared memory resources. As illustrated in FIG. 1, architecture 100 comprises 16 nodes. In various embodiments, more than 16 nodes may be included within architecture 100. Each node (0-15) is connected to every other node within architecture 100. In various embodiments, a node may be directly connected to one or more nodes as depicted in architecture 100, while in other embodiments a node may be connected to one or more nodes through other devices, including but not limited to routers and switches. In various embodiments, each node (0-15) may include one or more processors and one or more node controllers (not shown in FIG. 1), which is an advanced memory controller configured to enable processors within each node to access memory on all the other nodes.

Figure 2:
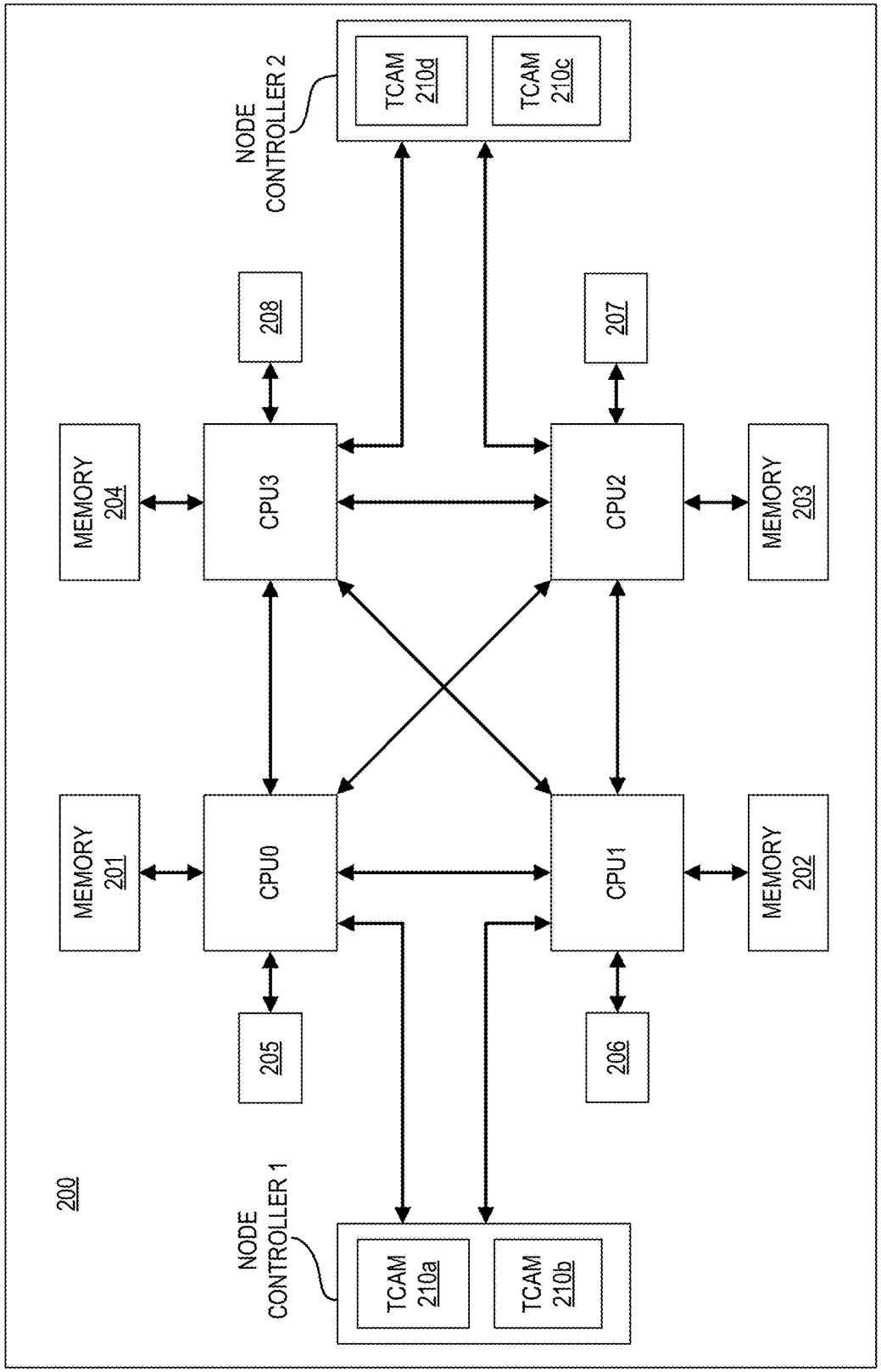
FIG. 2 is an example node in accordance with embodiments of the technology disclosed herein.

FIG. 2 illustrates an example node 200 in accordance with embodiments of the present disclosure. In various embodiments, node 200 may represent one or more of the nodes (0-15) discussed with respect to FIG. 1. Node 200 is provided for illustrative purposes only and should not be interpreted as limiting the scope of the technology discussed herein to only node 200. Node 200 shows only those components relevant to explaining the technology of the present disclosure, and a person of ordinary skill in the art would know how to implement common components of processing systems omitted from node 200.

In various embodiments, node 200 may be implemented as a single integrated circuit, including but not limited to an application specific integrated circuit (ASIC), a field programmable gate array (FPGA), a programmable logic array (PLA), complex programmable logic device (CPLD), or other integrated circuit component. In some embodiments, node 200 may comprise a printed circuit board (PCB) or multi-chip module with a plurality of chipsets disposed therein. As illustrated, node 200 includes four processors CPU0, CPU1, CPU2, CPU3. Each processor may contain one or more processor cores. Node 200 may have a similar structure to an SMP system, with each processor CPU0, CPU1, CPU2, CPU3 communicatively coupled to each other and having access to each memory 201, 202, 203, 204. In various embodiments, memory 201, 202, 203, 204 may comprise one or more types of non-transitory machine-readable storage media, including but not limited to: solid state storage devices (SSDs), single in-line memory modules (SIMMs), dual in-line memory modules (DIMMs), dynamic random-access memory (DRAM), static random-access memory (SRAM), among other common types of computer memory.

Each processor CPU0, CPU1, CPU2, CPU3 manages its respective memory component. Requests for data stored on memory 201, 202, 203, 204 are directed to the respective processor CPU0, CPU1, CPU2, CPU3. As a non-limiting example, if CPU2 needs a data block at an address in local memory 204, CPU2 may send a request to CPU3 to retrieve the requested data block and provide the data block to CPU2. In various embodiments, each memory 201, 202, 203, 204 may have an associated memory controller configured to control access to the data blocks of its respective memory component. Each memory controller may be implemented as a specialized logic circuit in some embodiments.

Although illustrated with each memory 201, 202, 203, 204 directly connected to one processor CPU0, CPU1, CPU2, CPU3, a person of ordinary skill in the art would know that in some embodiments each processor socket CPU0, CPU1, CPU2, CPU3 may be connected to one or more memory components. As a non-limiting example, CPU0 and CPU3 may be connected to memory 201, allowing both processors CPU0, CPU3 to directly access memory 201.

Memories 201, 202, 203, 204 combine with the local memories of other nodes within the system to form a shared main memory having a global address space. In various embodiments, memories 201, 202, 203, 204 may be combined into a local node memory, and the memories of other nodes in the system may be considered remote memory. Each memory 201, 202, 203, 204 may be a logical portion of the shared main memory, similar to a Level 3 cache. In various embodiments, each processor CPU0, CPU1, CPU2, CPU3 may include dedicated CPU cache (i.e., Level 1 cache, Level 2 cache) (not shown in FIG. 2) for storing copies of frequently used data from local memory (i.e., the combination of memories 201, 202, 203, 204) or remote memory (i.e., memories associated with remote nodes).

In various embodiments, each processor socket may have a dedicated cache 205, 206, 207, 208 comprising smaller, faster hardware memory associated with a respective processor CPU0, CPU1, CPU2, CPU3, respectively. Caches 205, 206, 207, 208 may be implemented in a variety of cache architectures, including but not limited to a set associated cache, a fully associative cache, a direct-mapped cache schematics, among other cache architectures common in the art. In some embodiments, caches 205, 206, 207, 208 may be implemented within processors CPU0, CPU1, CPU2, CPU3 as a single component. Caches 205, 206, 207, 208 may comprise one or more types of common cache memory components, including but not limited to SRAM, synchronous DRAM (SDRAM), flash memory, embedded DRAM (eDRAM), non-volatile RAM (NVRAM), among other types of cache memory components. Each respective cache 205, 206, 207, 208 is dedicated to each processor CPU0, CPU1, CPU2, CPU3, holding copies of data block values from the shared main memory to increase processing speed by reducing the need to retrieve data from slower shared main memory within the system.

As discussed above, a CPU cache (not shown in FIG. 2) is configured to hold data blocks pulled from the local memory of the node (i.e., from memories 201, 202, 203, 204) or remote memory (i.e., memories associated with remote nodes). Caches 205, 206, 207, 208 may be configured to store copies of data blocks retrieved from addresses in remote memory, from a different node. In some embodiments, CPU caches and caches 205, 206, 207, 208 may be combined into a single component.

Node 200 includes two node controllers, node controller 1 and node controller 2. As discussed above, node controller 1 and node controller 2 are tasked with managing the access of respective processors CPU0, CPU1, CPU2, CPU3 to remote memory and from remote processors to local memory. In various embodiments, there may be few or more node controllers per node. Each node controller serves as a system interconnect, providing each processor CPU0, CPU1, CPU2, CPU3 access to memory addresses within the shared memory, including the addresses present in memory components of other nodes in the system. In various embodiments, node controllers 1 and 2 may be implemented as a separate processor component, while in other embodiments node controllers 1 and 2 may be implemented as one or more specialized logic components, including but not limited to state machines configured to perform particular state operations. Each node controller 1 and 2 may comprise a plurality of fabric connectors (not shown in FIG. 2) to interconnect node controllers 1 and 2 with the other nodes within the system such as in the illustrated example in FIG. 1.

In various embodiments, each node controller 1 and 2 may control a subset of processors CPU0, CPU1, CPU2, CPU3. In the illustrated example, node controller 1 is communicatively coupled to processors CPU0 and CPU1, while node controller 2 is communicatively coupled to processors CPU2, CPU3. Moreover, each node controller 1 and 2 may proxy for all the processors on remote nodes. Node controllers 1 and 2 appear as a single remote processor to each of processors CPU0, CPU1, CPU2, CPU3. This allows the processor to maintain a more compact coherency directory and device addressing. As a non-limiting example, a processor's coherency directory may only track the state of ownership information of 4 to 8 other processors or devices.

As illustrated in FIG. 2, each node controller 1 and 2 includes one or more ternary content addressable memories (TCAMs) 210a, 210b, 210c, 210d. A TCAM is a specialized type of high-speed memory that searches its entire contents in a single clock cycle, similar to the common content-addressable memory (CAM). While CAM provides a binary search pattern (either 0 or 1) for each bit searched, TCAM allows storage and querying of data using at least three data search conditions: 0, 1, and X. The X is referred to as a "don't care" or "wildcard" state, which indicates one or more bits which do not need to exactly match during the search to indicate a match (also referred to as a hit). Use of three search conditions enables TCAM to perform broader searches based on pattern matching, rather than the exact-match binary search of traditional CAM. TCAM can operate on entries representing various sized memory blocks, allowing dynamic sizing of address tags to search. These dynamic sized tags are linked to dynamic sizing remote or local memory data blocks. TCAM allows a single entry to cover a range either wider or smaller than the size of the relevant cache line, reducing the need for individual, specific entries for each address of concern necessary for a CAM. It should be noted, however, that various embodiments are not necessarily limited to TCAMs, and can be applied/implemented in CAMs. Those of ordinary skill in the art would understand that if applying to CAMs (rather than TCAMs), tag size will be the same, as opposed to TCAMs where tag size can vary depending on how large a block of memory is being tracked by the coherency directory cache.

Each TCAM 210a, 210b, 210c, 210d may be configured to track ownership of any data blocks accessible by one of processors CPU0, CPU1, CPU2, CPU3 or any other processor socket in the system. As discussed above, there are various cache coherency protocols that can be implemented in SMPs to address the coherency issue. Generally, these cache coherency protocols utilize state tags to ensure that coherency is maintained, with common states including modified (M), exclusive (E), shared (S), and invalid (I). Modified indicates that the cache line is "dirty," meaning the value has been modified and is different from the value in the shared memory. Exclusive indicates that the value of a cache line is the same as the value in the shared memory, and that this cache maintains the only cached copy of that data block. Shared indicates that the value is the same as the value in a memory data block of the shared memory, but there are more than one copy of the main memory data block in other caches within the system. Invalid indicates the cache line data is not valid and may be reused. Every cache line starts off in the invalid state, indicating no ownership of the respective data block.

To illustrate an example of cache coherency protocol operation, CPU0 may read address X in memory 202. That is, CPU0 sends a read message to CPU1. CPU1 ensures the data for address X is not held by any processor, e.g., any of CPU0, CPU1, CPU2, or CPU3. To ensure the data is not held by any processor, CPU1 sends a snoop request message to node controller 1. It should be noted that a snoop request is not sent to CPU0 since CPU0 is the processor that sent the read request. Node controller 1 may have a miss in its coherency directory cache (i.e., not found in a TCAM (described in greater detail below). Node controller 1 fetches the coherency directory state from CPU1's memory, and node controller 1 responds to the snoop request with an "unowned" message. Node controller 1 saves a coherency directory state to the coherency directory cache. Because CPU1 now is aware that no other processor has the requested data, it can read address X for memory 202, and send the data to CPU0.

Next, CPU2 may read address X in memory 202, where CPU2 sends a read message to node controller 2, and node controller 2 forwards a read message to node controller 1. Node controller 1 has a hit in its TCAM (as it was saved, described above), and coherency directory cache indicates the data is "unowned". Thus, node controller 1 forwards the read to CPU1. CPU1 ensures the data for address X is not held by any processor. To do this, CPU1 sends a snoop message to CPU0 (similar to the above, CPU1 does not send a snoop message to node controller 2 since that is where the read came from. CPU0 sends a message back to CPU1 indicating it has surrendered ownership of the data, and CPU1 sends the data to node controller 1. Node controller 1 forwards the data to node controller 2, and node controller 1 updates the coherency directory cache state to indicate that CPU2 owns the data for address X. Node controller 2 can then forward the data message to CPU2.

Figure 3A:
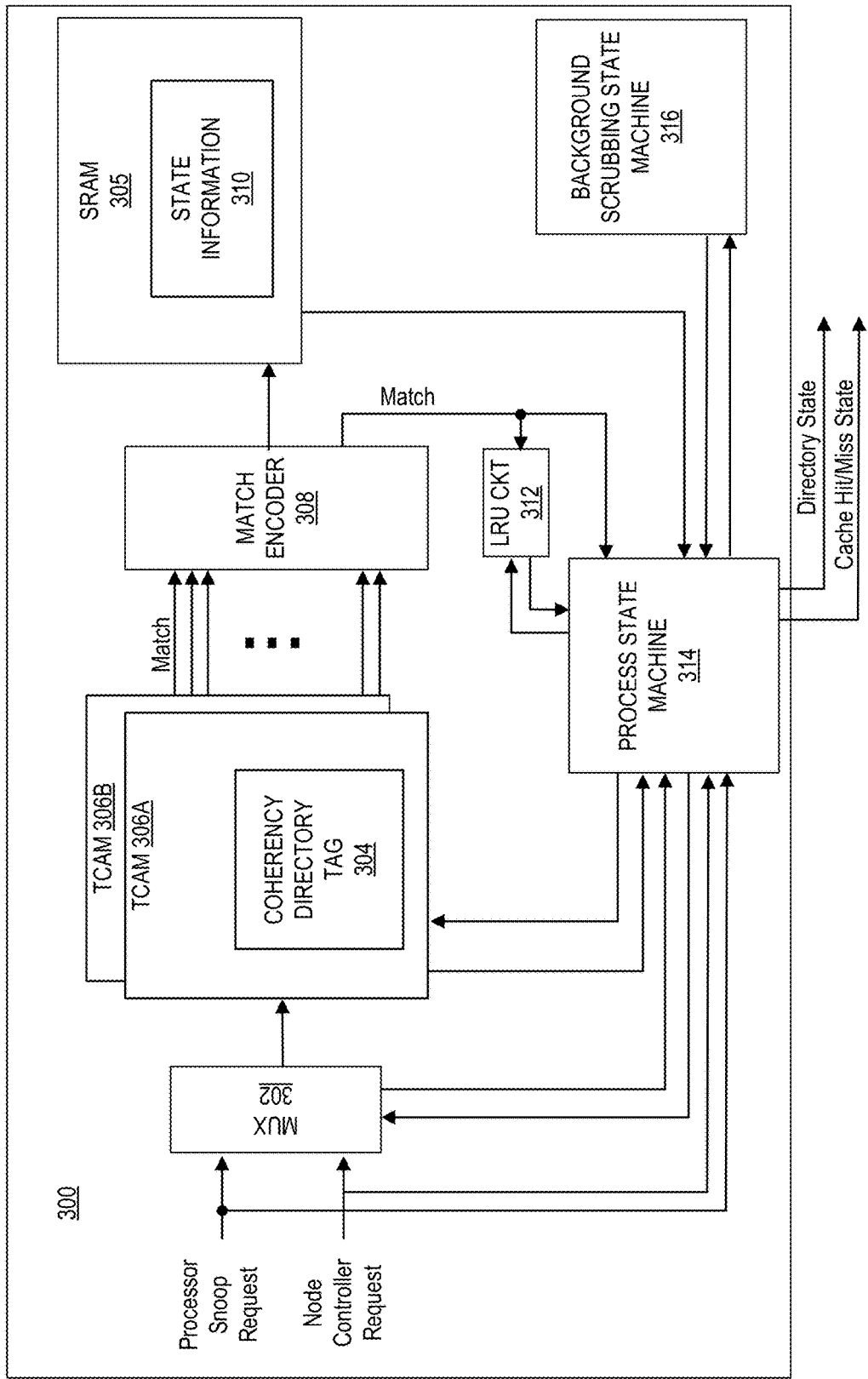
FIG. 3A is a schematic representation of an example layout of a coherency directory cache implementation apparatus in accordance with one embodiment of the technology disclosed herein.
Figure 3B:
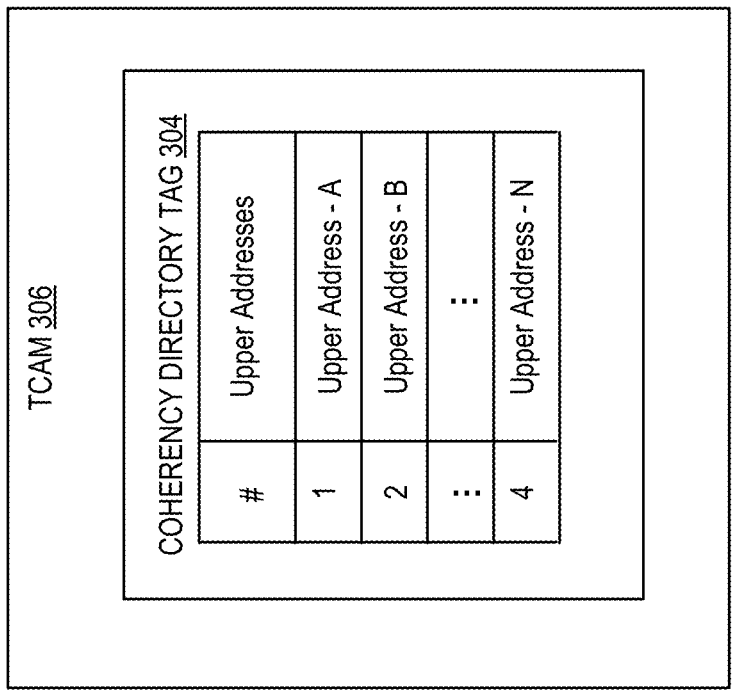
FIG. 3B is a schematic representation of an example TCAM in accordance with one embodiment of the technology disclosed herein.

Referring to FIG. 3A, an example coherency directory cache management apparatus or circuitry 300 may be implemented at a node controller, e.g., node controllers 1 and 2 (FIG. 2), and may include a multiplexer 302 to receive requests such as a processor snoop request (referenced in the above-described cache coherency example) or a node controller request. A processor snoop request may be described as an operation initiated by a local processor to inquire about the state and ownership of a memory block or cache line. A node controller request may be described as an operation initiated by a remote processor or remote node controller that was sent to a local node controller including apparatus 300. The requests may be directed to a coherency directory tag 304 to determine whether state information is present with respect to a particular memory block (i.e., cache line). The coherency directory tag 304 may include information related to a plurality of memory blocks. That is, and referring to FIG. 3B, the coherency directory tag 304 may include a collection of upper addresses that correspond to the system memory blocks or cache lines where the state and ownership information is being cached in the coherency directory cache (e.g., maintained in TCAMs 306A and 306B). For example, the upper addresses may include upper address-A, upper address-B, . . . , upper address-N, etc. Each upper address may have a corresponding row number (e.g., row number 1, 2, . . . , N) associated with each entry. Each upper address may be 0-N don't care bits depending on the location. As disclosed herein, the size of these memory blocks may be defined for ease of implementation to be the same as system cache lines for a computer system (or for different computer systems). These cache line sized memory blocks for discussion clarity may be referred to as cache lines.

Ownership may be described as an identification as to what node or processor has ownership of the tracked system memory block or cache line. In a shared state, ownership may include the nodes or processors that are sharing the system memory block or cache line.

The requests may be processed by one or more TCAMs 306A and 306B (each of which may be embodiments of one of TCAMs 210a-210d). For the TCAM 306A, each cache entry may include a TCAM entry to hold an upper address for comparison purposes with the requests. This upper address may be referred to as a tag. With respect to the upper address, a processor system may include a byte or word address that allows for the definition of the bits of data being accessed. When multiple bytes or words are grouped together into larger blocks, such as cache lines, the upper address bits may be used to uniquely locate each block or cache line of system memory, and lower address bits may be used to uniquely locate each byte or word within the system memory block or cache line.

A tag may be described as a linked descriptor used to identify the upper address. A directory tag may be described as a linked descriptor used in a directory portion of a cache memory. The coherency directory tag 304 may include all of the tags for the coherency directory cache, and may be described as a linked descriptor used in a directory portion of a coherency directory cache memory. The coherency directory tag 304 may include the upper address bits that define the block of system memory being tracked.

The directory tags may represent the portion of the coherency directory cache address that uniquely identifies the directory entries. The directory tags may be used to detect the presence of a directory cache line within the coherency directory tag 304, and, if so, the matching entry may identify where in the directory state storage the cached information is located. One coherency directory cache entry may represent the coherency state and ownership of a single system cache line of memory.

At the match encoder 308, a request processed by the TCAM 306A may be processed to ascertain a binary representation of the associated row (e.g., address) of the coherency directory tag 304. For the TCAM 306A, each row or entry of the TCAM 306A may include a match line that is activated when that entry matches the input search value. For example, if the TCAM 306A has 1024 entries, it will output 1024 match lines. These 1024 match lines may be encoded into a binary value that may be used, for example, for addressing the memory that is storing the state and ownership information. For example, if match line 255 is active, the encoded output from match encoder 308 would be 0xFF (as the encoder output field is 10 bits wide).

Referring also to FIG. 3C, a state information 310 block in SRAM 305 may include the current representation of the state and ownership of the memory block (i.e., cache line) for the request processed by the TCAM 306A. For example, the state information 310 may include a "valids" column that includes a set of valid bits (e.g., 1111, 0000, 0011, 0010), a "state info." column that includes information such as shared, invalid, or exclusive, and a "sharing vector/ownership" column that includes sharing information for a shared state, and ownership for the exclusive state. According to an example, the rows of the state information 310 may correspond to the rows of the coherency directory tag 304. Alternatively, a single row of the coherency directory tag 304 may correspond to multiple rows of the state information 310. With respect to coherency directory tag 304 and the state information 310, assuming that upper address-A covers four cache lines that are all valid, these four cache lines may include the same state information and sharing vector/ownership. The length of the valid bits may correspond to a number of decodes of the don't care bits. The coherency directory cache output information related to the memory block state and ownership information may also include a directory cache hit indicator status (e.g., a coherency directory tag 304 hit) or a directory cache miss indicator status responsive to the requests received by the multiplexer 302. The ownership may include an indication of a node (or nodes) of a computer system or different computer systems that are sharing the memory block. In this regard, the actual information stored may be dependent on the implementation and the coherency protocol that is used. For example, if the protocol being used includes a shared state, the ownership information may include a list of nodes or processors sharing a block. The state and ownership may be retrieved from the state information 310 memory storage based on the associated matching row from the TCAM 306 as encoded into a memory address by match encoder 308.

The directory hit or a directory miss information may be used for a coherency directory cache entry replacement policy. For example, the replacement policy may use least recently used (LRU) tracking circuit 312. The least recently used tracking circuit 312 may evict a least recently used cache entry if the associated cache is full and a new entry is to be added. In this regard, if an entry is evicted, the TCAM 306A may be updated accordingly. When the TCAM 306A is full, the complete coherency directory cache may be considered full. The LRU tracking circuit 312 may receive hit/miss information directly from the match encoder 308. However, the hit/miss information may also be received from the process state machine 314. When a cache hit is detected, the LRU tracking circuit 312 may update an associated list to move the matching entry to the most recently used position on the list.

Tag data associated with an entry in the TCAM 306A may include the possible memory states of "0", "1", or "X", where the "X" memory state may represent "0" or "1", and may be designated as a "don't care" memory state. The least significant digit in the TCAM 306A of a cache line address may define the address of the cache line within a group of cache lines. The least significant digits may be represented by the "X" memory state. Thus, one coherency directory cache entry may represent the state of several (e.g., 2, 4, 8, 16, etc.) system cache lines of memory. These memory blocks or system cache lines may be grouped by powers of 2, as well as non-powers of 2. For non-powers of 2, a comparison may be made on the address with respect to a range. For example, if the address is between A and C, then the memory blocks or system cache lines may be grouped. Thus, each TCAM entry may represent any number of system cache lines of memory. These multiple cache lines may be grouped based on a determination that the multiple cache lines are adjacent, and further based on a determination that the multiple cache lines include the same state and ownership to share a TCAM entry. In this regard, the adjacent cache lines may include cache lines that are within the bounds of a defined group. Thus, adjacent cache lines may include cache lines that are nearby, in close proximity, or meet a group addressing specification.

A process state machine 314 may analyze, based on the requests such as the processor snoop request and/or the node controller request, state and ownership information for associated cache lines to identify cache lines that may be consolidated with respect to the TCAM 306A.

A background scrubbing state machine 316 may also analyze state and ownership information associated with adjacent cache lines to identify cache lines that may be consolidated with respect to the TCAM 306A. Thus, with respect to consolidation of cache lines, the process state machine 314 may perform the consolidation function when adding a new entry, and the background scrubbing state machine 316 may perform the consolidation function as a background operation when the coherency directory cache is not busy processing other requests. With respect to the background operation performed by the background scrubbing state machine 316, the state and ownership information may change over time. When information with respect to a given block was originally written and could not be grouped because the state or ownership information did not match the information of other blocks that would be in the combined group, this information for the given block may correspond to a separate coherency directory cache entry. If, at a later time, some of the information related to state or ownership changes, the grouping may now possibly occur. Thus, the background scrubbing state machine 316 may operate when the requests such as the processor snoop request and/or the node controller request are not being processed. In this regard, the background scrubbing state machine 316 may find matching entries and rewrite the TCAM entries to perform the grouping of memory blocks to be represented by a single entry as disclosed herein.

State information may include a 4-bit valid field. The implementation with the 4-bit valid field may represent an implementation where the two least significant upper address bits may be allowed to be "don't care." In this regard, with respect to other implementations, a number of bits in the validity field would change. For example, for an implementation with up to 3 "don't care" bits, the valid field would be 8 bits long, because there are $2^3=8$ (or generally, $2^n$, where n represents the number of "don't care" bits) unique decodes of the three lower address bits. With respect to the state information that includes a 4-bit valid field, each of these 4 bits may correspond to a decode of the lower two bits of the upper address allowing an association of each bit with one of the four cache lines within the four cache line group. These 4 bits may be considered as valid bits for each of the four system memory cache lines. Each TCAM entry may now represent the state and ownership information for anywhere from zero, not a valid entry, to four cache lines of system memory. The coherency directory cache tracking may be described as the coherency directory cache monitoring the status of whether the bit is active or inactive.

A search of the TCAM 306A may be performed to determine whether a new entry is to be added. The search of the TCAM 306A may be performed using the upper address bits of the cache line corresponding to the received request. If there is a TCAM miss then the tag may be written into an unused entry. If all cache entries are used, then a least recently used entry may be evicted and the new tag may be written into that TCAM entry.

If during the TCAM search there is a match between the new upper address bits and a tag entry within the TCAM, the 4-bit field discussed above may be examined. If the corresponding bit in the 4-bit field, as selected by a decode of the lower two bits of the upper address, is set, then a cache hit may be indicated and processing may continue. If the corresponding bit in the 4-bit field discussed above is not set, then a comparison may be made of the state and ownership information. If the state and ownership information is the same for the new system memory cache line and the cached value of the state and ownership information, then the corresponding bit in the 4-bit field may be set to add this new system memory cache line to the coherency directory tag 304. The state and ownership field may apply to all cache lines matching the address field and that have a corresponding valid bit in the 4-bit validity field. Thus, if the state and ownership of the cache line being evaluated match the state and ownership field, then the corresponding bit of the validity field may be set. With respect to the state and ownership information, based on a determination that the specified bit is not set, the process state machine 314 may further include hardware (or processor implemented instructions) to determine whether a state and an ownership associated with the new entry are respectively identical to the state and the ownership associated with the previous entry. Further, based on a determination that the state and the ownership associated with the new entry are respectively identical to the state and the ownership associated with the previous entry, the process state machine 314 may further include hardware (or processor implemented instructions) to set the specified bit to add the new entry to the apparatus 300. In this regard, setting the specified bit may refer to the valid bit associated with the specific system memory block or cache line.

If the corresponding bit in the 4-bit field discussed above is not set, then a comparison may be made of the state and ownership information. If the state and ownership information as read from the state information 310 are not the same as the state and ownership information associated with the new tag, then this new tag may be added to the TCAM 306A.

According to an example, assuming that the coherency directory tag 304 includes an entry for 10X, a validity field 0011, and a state/ownership SO, and a snoop request is received for cache line address 103, which has state/ownership SO, then the entry for 10X may be updated to address 1XX, the validity field may be set to 0111, and SO may be returned in response to the snoop.

Part of the information in the processor snoop request and the node controller request may be used to determine how the select on the multiplexer 302 is to be driven. If there is a processor snoop request and no node controller request, the process state machine 314 may drive the select line to the multiplexer 302 to select the processor snoop request.

The process state machine 314 may control the multiplexer 302 in the example implementation of FIG. 3A. The process state machine 314 may receive part of the amplifying information related to a different request that is selected.

With respect to information sent from the match encoder 308 to the process state machine 314 and LRU tracking circuit 312, the process state machine 314 and LRU tracking circuit 312 may receive both the match/not match indicator and the TCAM row address of the matching entry from the match encoder 308.

The directory state output may include the state and the ownership information for a matching request. The directory state output may be sent to other circuits within the node controller or processor application-specific integrated circuit (ASIC) where the apparatus 300 is located. The other circuits may include the circuit that sent the initial request to the coherency directory cache.

The cache hit/miss state output shown in FIG. 3A may represent an indication as to whether the request matched an entry within the coherency directory cache or not. The cache hit/miss state output may be sent to other circuits within the node controller or processor ASIC where the apparatus 300 is located. The other circuits may include the circuit that sent the initial request to the coherency directory cache.

As alluded to above, multiple TCAMs, e.g., two TCAMs, are generally used to effectuate error detection/correction by storing redundant copies of coherency directory cache entries in separate TCAMs. That is, coherency directory caches can be modified, and so the most up-to-date version of a coherency directory cache entry resides in a node controller coherency directory cache. Thus, coherency state, ownership, and system cache coherency can be lost if there is a TCAM failure, and so a redundant TCAM is used to maintain another copy of coherency directory cache entries. However, TCAMs tend to be large, and the use of multiple TCAMs is die area-inefficient.

Figure 3D:
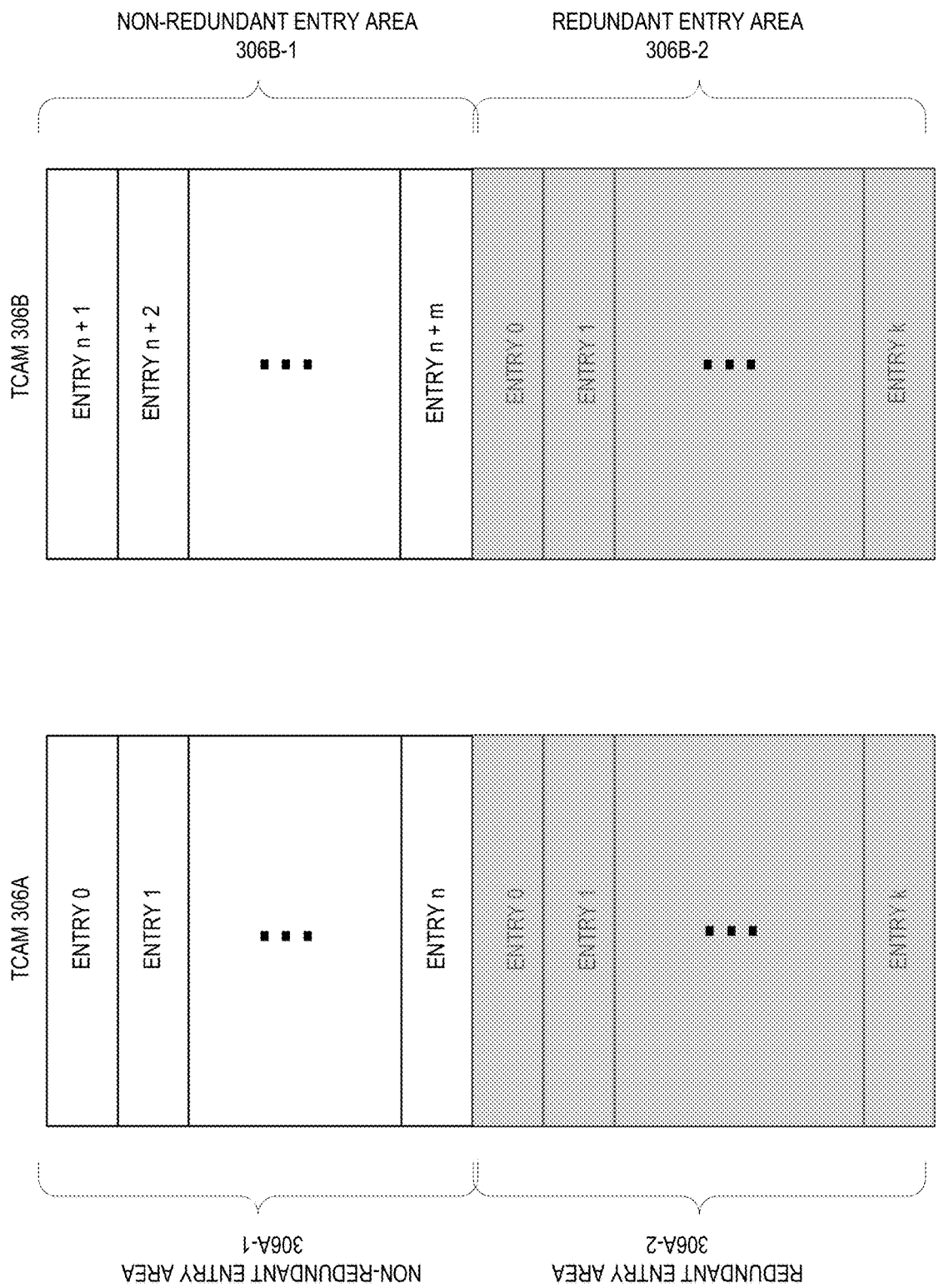
FIG. 3D is a schematic representation of example separate TCAM areas in accordance with one embodiment of the technology disclosed herein.

Accordingly, the use of redundant TCAM storage is reserved for dirty coherency directory cache entries. That is, only a portion of TCAM is reserved for redundant entries, and remaining portions of TCAM can be utilized for non-redundant entries. Referring now to FIG. 3D, a first TCAM, e.g., TCAM 306A, may comprise an area for non-redundant coherency cache entries 306A-1 and another area reserved for redundant coherency directory cache entries 306A-2. Another TCAM, e.g., TCAM 306B may also comprise an area for non-redundant coherency cache entries 306B-1 and another area reserved for redundant coherency directory cache entries 306B-2. Areas 306A-2 and 306B-2 are used to store redundant copies of dirty/modified coherency directory cache entries. As alluded to above, in other embodiments, a single TCAM (or CAM) may comprise multiple redundant entry areas (as opposed to splitting redundant entry areas between two separate TCAMs/CAMs). For example, redundant entry area 306A-2 may, in other embodiments, be split into distinct redundant entry areas to store modified entries in a single TCAM, i.e., TCAM 306A.

For example, and referring back to FIG. 2, CPU2 may read an address X in memory 202, where CPU2 sends a read message to node controller 2, and node controller 2 forwards a read message to node controller 1. Node controller 1 has a hit in TCAM 210a, and the coherency directory cache indicates the data is "unowned." Thus, node controller 1 forwards the read to CPU1. CPU1 ensures the data for address X is not held by any processor by sending a snoop message to CPU0. CPU0 sends a message back to CPU1 indicating it has surrendered ownership of the data, and CPU1 sends the data to node controller 1. Node controller 1 forwards the data to node controller 2, and node controller 2 updates the coherency directory cache state to indicate that CPU2 owns the data for address X. Node controller 2 can then forward the data message to CPU2. Because the coherency directory cache state has been modified, the entry is considered dirty, and the coherency directory cache entry is stored in redundant entry area 306A-2 as well as in redundant entry area 306B-2.

Redundant storage is used because the latest, most up-to-date version of the coherency directory cache entry only resides in the coherency directory cache of the node controller (not in main/host memory). For example, when TCAM tag entries are appended with an error correction code, a search with both the tag and corresponding error correction code could result in a miss when a TCAM bit error occurs. However, this appended error correction code only provides error protection until that entry is modified. Should the TCAM implementing the coherency directory cache fail, system cache coherency could be lost, unless redundant caching is performed. By using redundant TCAMs, error detection and correction functionality can be retained in an SMP system. Referring again to FIG. 3D, TCAM 306A comprises a redundant entry area 306A-2, and any entries stored therein are also stored in redundant entry area 306B-2 of TCAM 306B, and vice-versa. It should be appreciated that the same rows, respectively in both TCAMs 306A and 306B, are used for the redundant entry areas 306A-2 and 306B-2.

However, any coherency directory cache entries that are non-dirty/non-modified entries, are not stored in a redundant fashion. That is, a clean entry that has not been modified locally, e.g., at a node controller, is an entry that accurately reflects the contents of main/host memory in a coherency directory cache of the node controller. Because such an entry already accurately reflects the main/host memory, coherency will not be lost even if the TCAM in which the entry is stored fails, as a coherency directory cache miss will cause a read from the full directory stored in main/host memory. Referring back to FIG. 3D, clean entries may be stored in non-redundant entry areas of TCAMs 306A and 306B, e.g., in one of redundant entry areas 306A-1 or 306B-1. For example, clean entries 0 through n may be stored in non-redundant entry area 306A-1 of TCAM 306A, while subsequent clean entries n+1 through n+m may be stored in non-redundant entry area 306B-1 of TCAM 306B.

For example, and referring back to FIG. 2, CPU0 may read address X in memory 202. That is, CPU0 sends a read message to CPU1. CPU1 ensures the data for address X is not held by any processor, e.g., any of CPU0, CPU1, CPU2, or CPU3, by sending a snoop request message to node controller 1. Node controller 1 may have a miss in its coherency directory cache (i.e., not found in a TCAM (described in greater detail below)). Node controller 1 fetches the coherency directory state from CPU1's memory, and node controller 1 responds to the snoop request with an "unowned" message. Node controller 1 saves a coherency directory state to the coherency directory cache. Because CPU1 now is aware that no other processor has the requested data, it can read address X for memory 202, and send the data to CPU0. Since the coherency directory cache state has not changed, the corresponding tag entry is a clean tag entry, and can be stored in either non-redundant entry area 306A-1 or 306B-1 (FIG. 3D) of TCAMs 306A or 306B, respectively.

Because an entire TCAM is not relegated to storing redundant coherency directory cache entries, die area efficiency is increased. For example, if 25% of entries in a TCAM are used as redundant entries in one embodiment, 75% more non-redundant TCAM entries can be provided versus the conventional "fully-redundant" TCAM scheme. That is, assuming 1024 fully redundant entries, 25% is 256, leaving 768 entries in each TCAM making a total of 256+768*2=1792 entries, and (1792-1024)/1024=75%. In accordance with some embodiments, some number of TCAM entries can be set aside as redundant entries, and this number of TCAM entries set aside as redundant entries can be determined/programmable. In accordance with other embodiments, the number of TCAM entries set aside for redundant entries may be adaptive based on the number of dirty entries. In one embodiment, all redundant and non-redundant entries can be tracked with the LRU algorithm, and the oldest entries can be replaced. Alternatively, in another embodiment, a programmable threshold can be specified for, e.g., a maximum number of modified entries, can be implemented with a counter such that when the count reaches the programmable threshold, evictions of entries will commence. It is also possible, in accordance with yet another embodiment, to adjust the programmable threshold based on an algorithm that looks at past replacement of entries. For example, if a circuit was maintaining two separate LRU linked lists, and more redundant entries were being replaced over a certain period of time, the programmable threshold can be adjusted to increase the number of allowed redundant entries or vice versa.

Figure 4A:
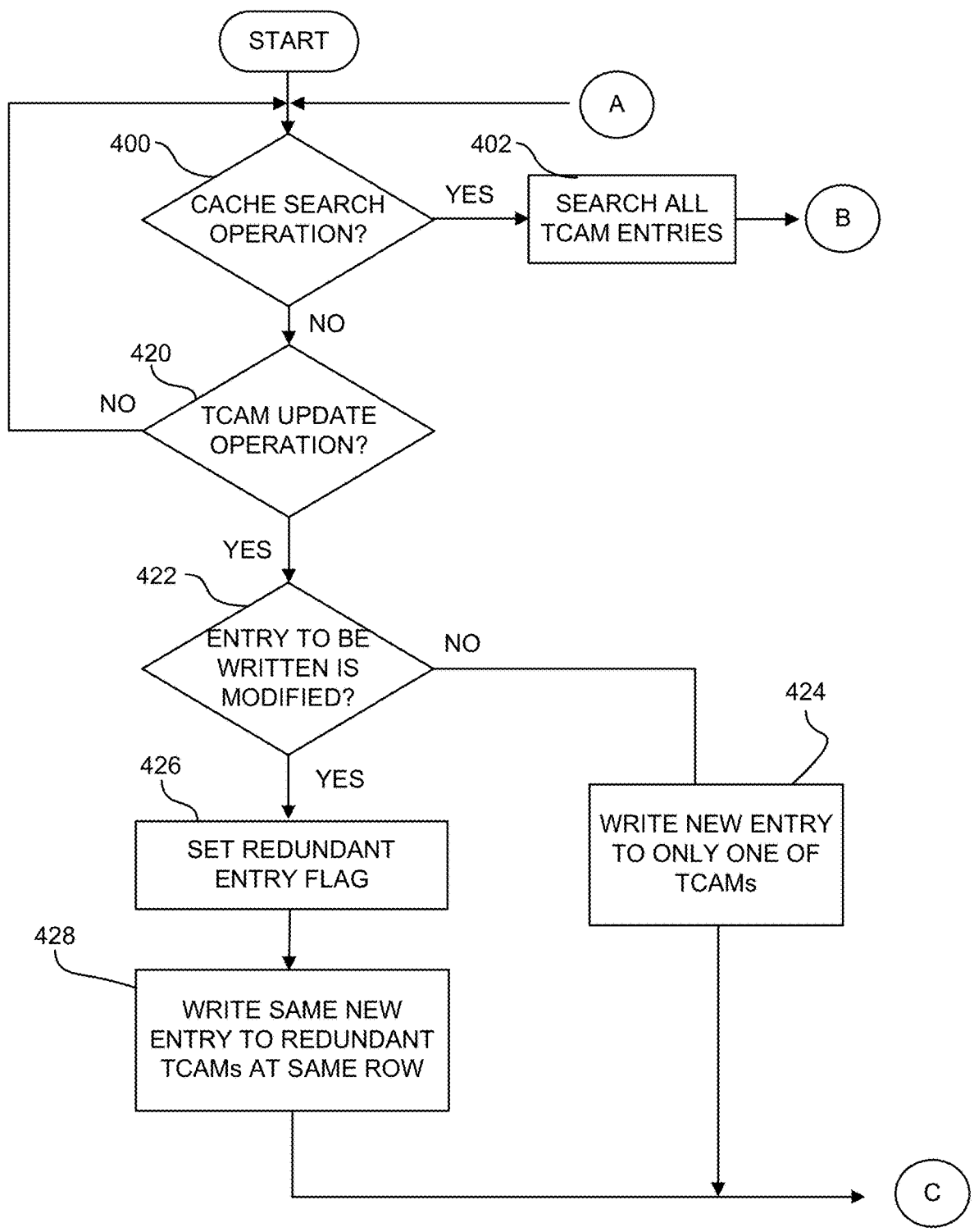
FIG. 4A shows a first part of an example coherency directory cache management flow in accordance with one embodiment of the technology disclosed herein.
Figure 4B:
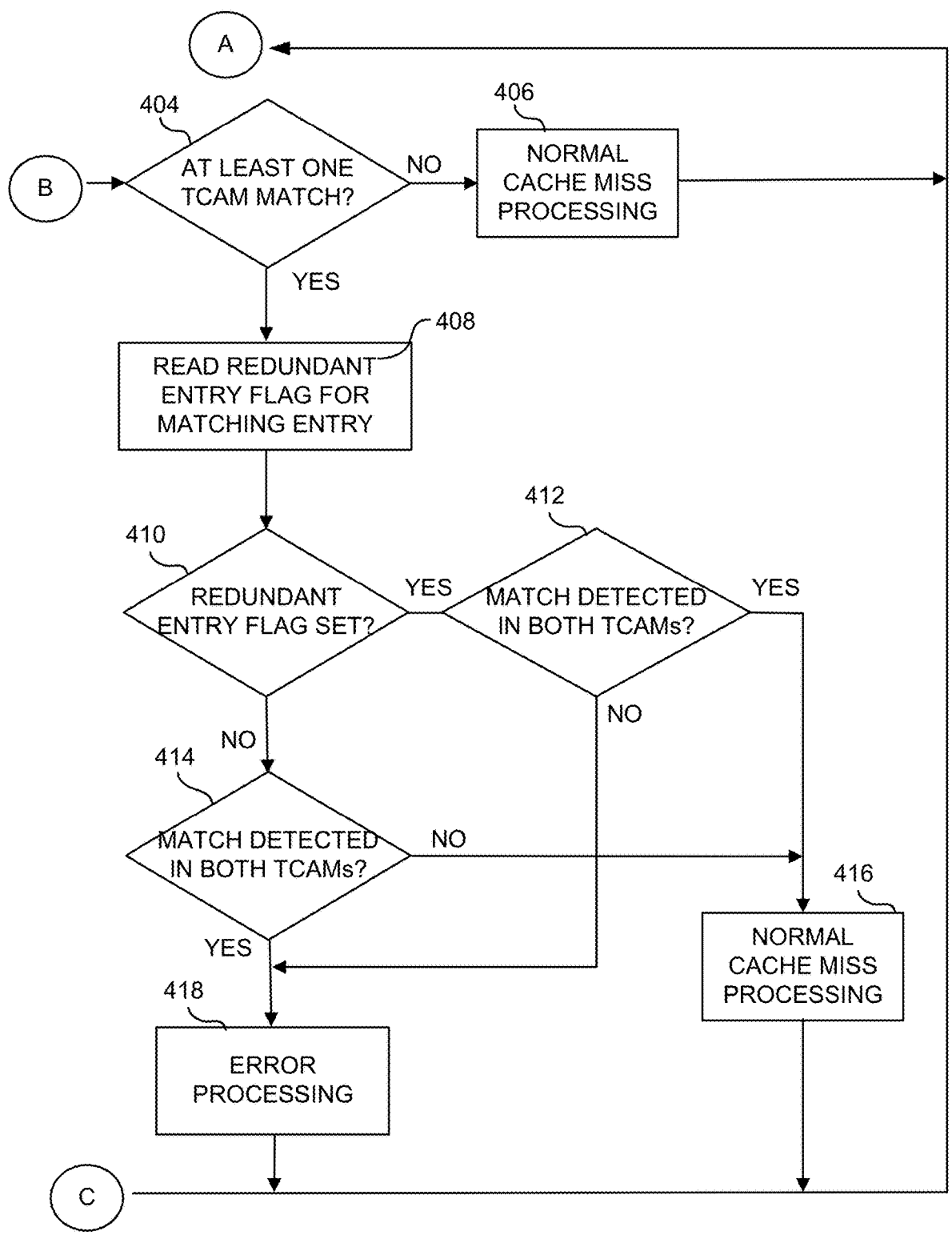
FIG. 4B shows a second part of the example coherency directory cache management flow of FIG. 4A.

Referring to FIGS. 4A and 4B, a flow chart of example operations that may be performed to manage a coherency directory cache in accordance with some embodiments is described. A node controller may receive a message or request, and at operation 400, a check is performed to determine whether the message/request comprises a cache search operation, such as a snoop request. As noted above, such a message/request may be received at a multiplexer (e.g., MUX 302) of the node controller.

Based on a determination that the received message/request involves a coherency directory cache search, at operation 402, process state machine 314 may trigger a TCAM search, e.g., trigger TCAMs 210A and 210B to search their respective coherency directory tags (one example of which is coherency directory tag 304). That is, the address associated with the cache line included in the received message/request may be used to search for a matching tag value in one or more TCAMs (in this example in one or more of TCAMs 306A and 306B). As disclosed herein, for the TCAM-implemented coherency directory tag, each cache entry may include a TCAM entry to hold the upper address or tag to compare against. As discussed above, directory tags may represent the portion of the directory address that uniquely identifies the directory tag, wherein the tags may be used to detect the presence of a directory cache line within the node controller, and, if so, the matching entry may identify where in the directory state information (e.g., 310) storage the cached information is located. At operation 404, a determination is made as to whether or not at least one TCAM match is found/exists. If there are no matches, conventional cache miss processing may be performed at operation 406 (described above). Again, and for example, assuming that a request is received for address 1110, with respect to TCAM entries for address 1111, address 111X, and address 11XX (e.g., with up to two least significant digit "don't care" bits), matches may be determined as follows. The 0 bit of the received address does not match the corresponding 1 bit of the TCAM address 1111, and thus a miss would result. Conversely, the 0 bit of the received address is not compared to the corresponding X bits of the TCAM addresses 111X and 11XX, resulting in a match.

If at least one TCAM match exists, at operation 408, process state machine 314 reads a redundant entry flag for the matching entry that was found. It should be understood that the use of the redundant entry flag can depend on implementation. For example, in one embodiment, if TCAMs are, e.g., hard-divided into redundant and non-redundant entry areas, any match in a redundant entry area will have a corresponding match between the two TCAMs. If an adaptable/dynamic allocation scheme is used in accordance with another embodiment, a table structure implemented, e.g., in SRAM or random logic could be used to record such a redundant entry flag when the two entries are written to the two TCAMs. In this way, a fast-lookup can be performed when a match is detected. If a redundant entry flag is set (determined at operation 410), a check is performed (at operation 412) by process state machine 314 to determine if a match was detected in both TCAMs 306A and 306B (i.e., the primary and redundant TCAMs). If so, conventional coherency directory cache match processing may be performed at operation 416 (described above). For example, process state machine 314 may obtain the TCAM row address associated with the matching entry. In this scenario, a match amongst redundant TCAMs is to be expected if the redundant entry flag is set. If a redundant entry flag is not set (determined at operation 410), a check is performed (at operation 414) by process state machine 314 to determine if a match was detected in both TCAMs 306A and 306B. In this scenario, where a redundant entry flag was not set, a match in both TCAMs 306A and 306B suggests an error (or if a match was not detected in both TCAMs 306A and 306B, when a match in both TCAMs 306A and 306B should have been found). Thus, at operation 418, error processing is performed, e.g., an error may be thrown in response to the received message/request. If a match was not detected in both TCAMs 306A and 306B (to be expected if the redundant entry flag is not set), normal cache match processing occurs at operation 416.

If, based on a determination resulting from the check (at operation 400) to determine if the received request/message was a cache search operation, a determination is made that it was not a cache search operation, process state machine 314 makes a determination as to whether or not the received message/request comprises a TCAM update operation (at operation 420). If not, processing can return to operation 400. If so, (at operation 422), a check may be performed by process state machine 314 to determine if the entry to be written is modified. A TCAM update operation may be reflecting a change in coherency directory cache state. For example, based on a determination at (operation 420) that the message/request is a state change request, the process state machine 314 may examine stored state information to determine if multiple valid bits are set. Based on a determination that multiple valid bits are not set, the state information may be updated. Based on a determination that multiple valid bits are set, process state machine 314 may calculate and update new "don't care" bits for the current TCAM entry. For example, for a single TCAM entry representing four memory blocks, the most significant "don't care" bit may be cleared, and changed from don't care to a match on one (or zero). Then, process state machine 314 may update state information and adjust valid bits. For example, for the match on one as discussed above, for associated state information valid bits that are all 1111, the valid bits may be changed to 1100.

At operation 426, a redundant entry flag is set by process state machine 314. Recalling that modified or dirty coherency directory cache entries are to be redundantly stored in two TCAMs, the redundant entry flag can be set so that it can be specified (during a subsequent search for this particular TCAM entry) that a match amongst two TCAMs is to be expected (as described above regarding operations 410-416). At operation 428, the process state machine 314 may add a new TCAM entry associated with the state change request. Here, because the entry is a dirty entry, process state machine 314 may write the entry into both TCAMs 306A and 306B (in their respective redundant entry areas 306A-2 and 306B-2) and write the associated state information that matches the address associated with the state change request. Writing of the modified entry may be dependent upon an LRU linked list set forth by LRU circuit 312 (e.g., depending on whether an LRU entry must be evicted).

It should be noted that modified entries can be stored in an available entry, and need not be stored in accordance with an LRU linked list. Those of ordinary skill in the art would understand that other methods of determining placement of modified entries can be used. For example, in another embodiment, entry assignment can be free-flowing, where two TCAM entries are evicted when needed for redundant entry storage of modified entries. For example, in another embodiment, a modified entry can replace a non-redundant/non-modified LRU entry by performing a write-back of the modified information.

Returning to operation 422, based upon a determination that the coherency directory cache entry to be written is not modified, at operation 424, process state machine 314 may write the new coherency directory cache entry to one of TCAMs 306A or 306B in either of their respective non-redundant entry areas 306A-1 or 306B-1.

Figure 5:
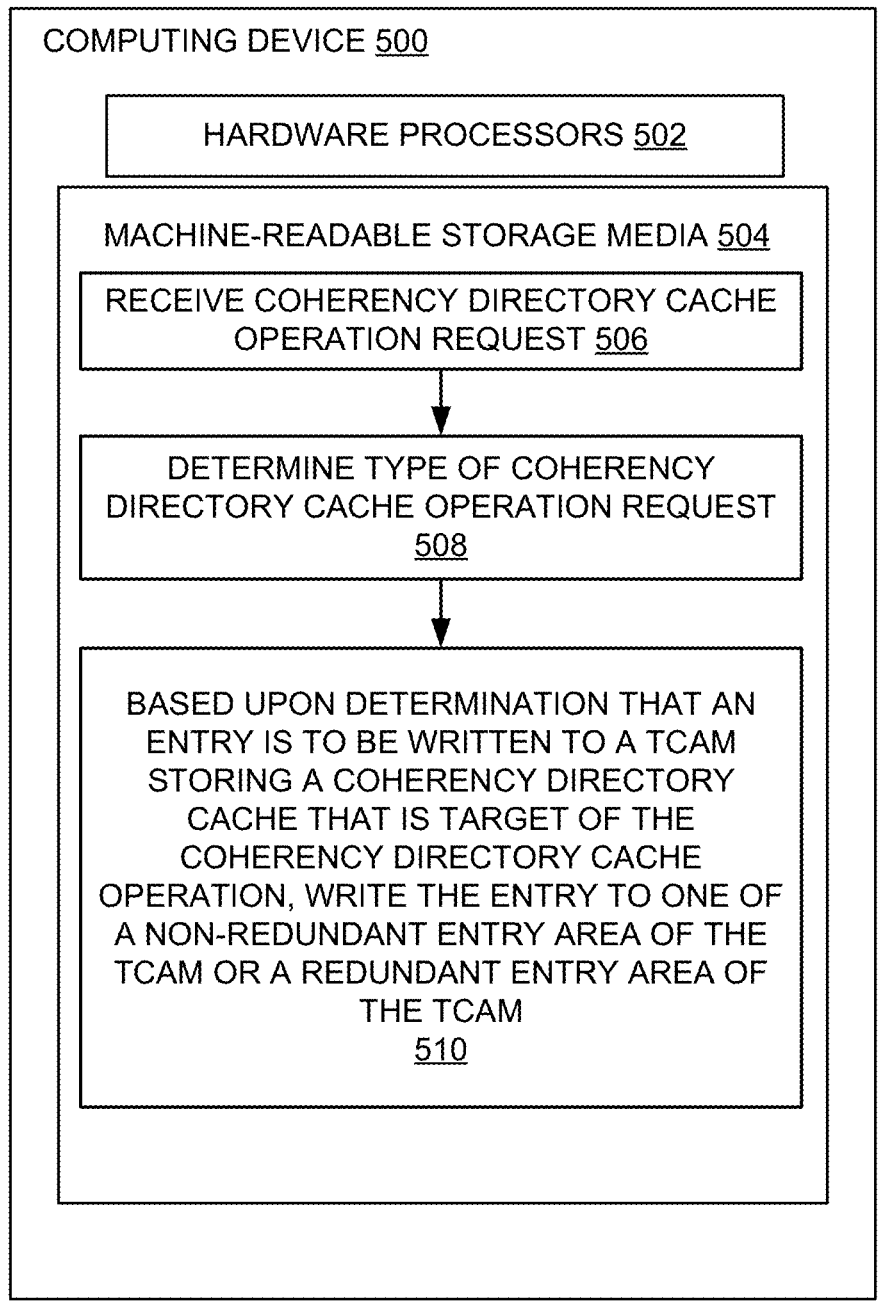
FIG. 5 is an example computing device for performing TCAM error detection and correction in accordance with one embodiment of the technology disclosed herein.

FIG. 5 is an example computing device 500 in accordance with embodiments of the present disclosure. Where operations and functionality of computing device 500 are the same or similar to those discussed with respect to FIGS. 1-4B, the description should be interpreted to apply. For example, computing device 500 may be an embodiment of node 200, a node controller, e.g., one of node controllers 1 or 2, an apparatus 300, a process state machine 314, etc. Computing device 500 includes one or more hardware processors 502 that may be one or more central processing units (CPUs), semiconductor-based microprocessors, and/or other hardware devices suitable for retrieval and execution of instructions stored in machine-readable storage medium, 504. The one or more hardware processor 502 may fetch, decode, and execute instructions, such as instructions 506-510, to control processes or operations for effectuating error detection and control in the context of coherency directory caches in accordance with one embodiment. As an alternative or in addition to retrieving and executing instructions, the one or more hardware processors 502 may include one or more electronic circuits that include electronic components for performing the functionality of one or more instructions, such as a field programmable gate array (FPGA), application specific integrated circuit (ASIC), or other electronic circuits.

The one or more hardware processors 502 are configured to execute instructions stored on a machine-readable medium 504. Machine readable medium 504 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 504 may include various sub-instructions for performing the function embodied by the identified functions. For example, the instruction "receive coherency directory cache operation request" may include various sub-instructions for receiving, by a node controller, one or more coherency directory cache operation requests from a plurality of local processors and node controllers from other nodes within a multiprocessor system in a manner discussed with respect to FIGS. 1-4B above.

The one or more hardware processors 502 may execute instruction 506 to receive a coherency directory cache operation request. As described above, a node controller may receive various messages or requests regarding a coherency directory cache stored at the node controller. Operations can involve memory operations, inquiries regarding state and/or ownership of data, operational requests originating from remote nodes, etc. For example, a request may be directed to a coherency directory cache tag within a TCAM.

The one or more hardware processors 502 may execute instruction 508 to determine the type of coherency directory cache operation request that was received. For example, instruction 508 may include a sub-instruction to determine if the coherency directory cache operation request is a cache search operation. If the requested coherency directory cache operation is a cache search operation, TCAM entries may be searched, and hit/miss processing or error processing may be executed. If the requested coherency directory cache operation is not a cache search operation, instruction 508 may include a further sub-instruction to determine if the requested coherency directory cache operation is instead, a TCAM update operation. If not, the one or more hardware processors 502 can return to waiting for another message/request. Instruction 508 may include yet another sub-instruction to determine if an entry to be written to the coherency directory cache is modified if the requested coherency directory cache operation is indeed a TCAM update operation.

As described above, modified or dirty entries, where a node/coherency directory cache contains the last/latest updated version of an entry (and thus may conflict with the state/ownership/value of an entry maintained in host memory, redundant TCAM caching is utilized to maintain coherency. If the entry is not modified, coherency is not at issue inasmuch as the host/main memory will accurately reflect the entry in a local coherency directory cache at a node. Therefore, redundant TCAM caching is unnecessary for un-modified entries. Accordingly, TCAMs can be configured (either programmably or adaptively) to contain/comprise non-redundant entry areas and redundant entry areas. By not reserving entire TCAMs to redundant entries, die-area inefficiency can be improved or mitigated. Therefore, the one or more hardware processor 502 may execute instruction 510 to, based upon a determination that an entry is to be written to a TCAM storing a coherency directory cache that is a target of the coherency directory cache operation, write the entry to one of a non-redundant entry area of the TCAM or a redundant entry area of the TCAM.

Figure 6:
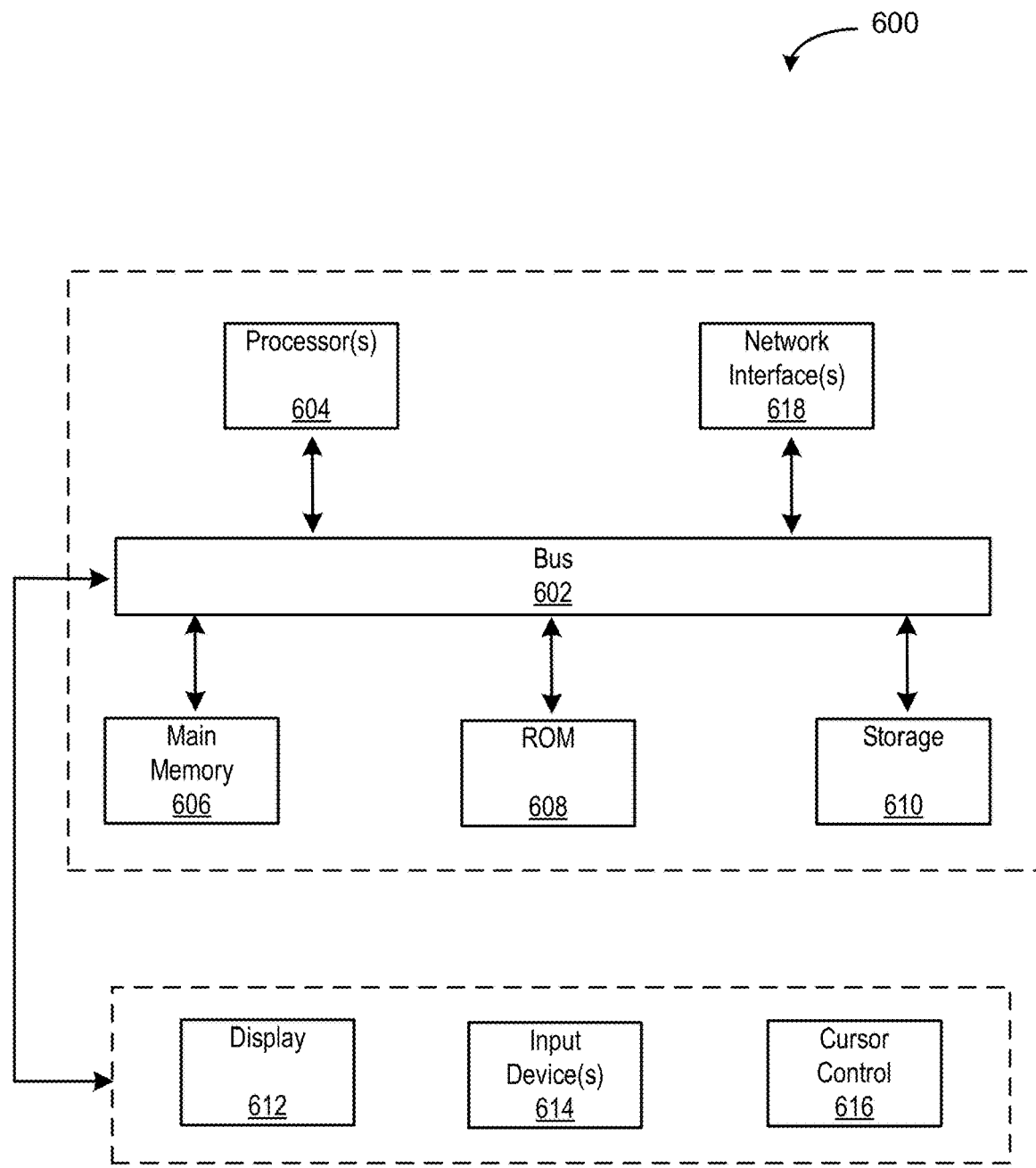
FIG. 6 is an example computing system in which embodiments described in the present disclosure may be implemented.

FIG. 6 depicts a block diagram of an example computer system 600 in which variations of the embodiments described herein may be implemented. The computer system 600 includes a bus 602, network, crossbar or other communication interconnect mechanism for communicating information, one or more hardware processors 604 coupled with bus 602 for processing information. Hardware processor(s) 604 may be, for example, one or more general purpose microprocessors. In various embodiments, the one or more hardware processors 604 may execute non-transitory machine-readable instructions to perform the various functions of the embodiments discussed with respect to FIGS. 1-3 and 4A-4C.

The computer system 600 also includes a main memory 606, such as a random access memory (RAM), cache and/or other dynamic storage devices, coupled to bus 602 or other communication interconnect mechanism for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 or other communication interconnect mechanism for storing static information and instructions for processor 604. A storage device 610, such as a magnetic disk, optical disk, or USB thumb drive (Flash drive), etc., is provided and coupled to bus 602 for storing information and instructions.

The computer system 600 may further include a display 612, input device 614, and/or a cursor control 616 coupled to bus 602 or other communication interconnect mechanism for displaying, communicating, and entering information and/or commands. In some embodiments, the same direction information and command selections as cursor control may be implemented via receiving touches on a touch screen without a cursor. The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. In various embodiments, such instructions may be similar to those discussed with respect to FIG. 5. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infrared data communications.

The computer system 600 also includes a communication interface 618 coupled to bus 602 or other communication interconnect mechanism for enabling two way communication with one or more networks over one or more network links. For example, communication interface 618 may be an integrated services digital network (ISDN) card, cable modem, satellite modem, a modem to provide a data communication connection to a corresponding type of telephone line, a local area network (LAN), a wide area network, or one or more types of wireless communication links.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the figures accompanying this disclosure and described in the preceding sections are provided for illustrative purposes only, and should not be interpreted as limiting the scope of the present disclosure. The scope of this disclosure is governed by the claims attached hereto and similar embodiments as would be within the ordinary skill of the art, using the same or equivalent elements. The omission of common components, circuits, devices, machines, or other elements which are known in the art to be present in apparatuses and devices in accordance with the present disclosure does not constitute such components falling outside the scope of this disclosure. A person of ordinary skill in the art knows how such common components are utilized and can understand the subject matter without specific recitation of these common components.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, circuitry might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus, comprising:
   one or more processors; and
   a memory unit operatively connected to the one or more processors, the memory unit including instructions that when executed, cause the one or more processors to:
   receive a coherency directory cache operation request;
   determine a type of the coherency directory cache operation request; and
   based upon a determination that an entry is to be written to a content-addressable memory (CAM) storing a coherency directory cache that is a target of the coherency directory cache operation request, write the entry to one of a non-redundant entry area of the CAM or to a redundant entry area of the CAM;
   wherein the instructions that when executed cause the one or more processors to determine the type of the coherency directory cache operation request comprises sub-instructions that when executed further cause the one or more processors to determine if the coherency directory cache operation request comprises a cache search operation.

2. The apparatus of claim 1 wherein the memory unit includes instructions that when executed further cause the one or more processors to search all entries of the CAM to determine existence of at least one CAM match, and perform one of cache hit processing, cache miss processing, or error processing based on the determination of the existence of the at least one CAM match.

3. The apparatus of claim 1 wherein the memory unit includes instructions that when executed further cause the one or more processors to determine if the coherency directory cache operation request involves a CAM update operation, upon a determination that the coherency directory cache operation request is not a cache search operation.

4. The apparatus of claim 3, wherein the memory unit includes instructions that when executed further cause the one or more processors to determine if the entry to be written to the CAM is modified.

5. The apparatus of claim 4, wherein the instructions that when executed cause the one or more processors to write the entry to the redundant entry area of the CAM are executed upon the determination that the entry to be written to the CAM is modified.

6. The apparatus of claim 5, wherein the memory unit includes instructions that when executed further cause the one or more processors to set a redundant entry flag upon the determination that the entry to be written to the CAM is modified.

7. The apparatus of claim 6, wherein the memory unit includes instructions that when executed further cause the one or more processors to write a same entry to a redundant entry area of another CAM, wherein respective rows of the CAM and the other CAM to which the same entries are written are the same.

8. The apparatus of claim 6, wherein the memory unit includes instructions that when executed further cause the one or more processors to write a same entry to another redundant entry area of the CAM.

9. The apparatus of claim 1, wherein the instructions that when executed cause the one or more processors to write the entry to the non-redundant entry area of the CAM are executed upon the determination that the entry to be written to the CAM is not modified.

10. The apparatus of claim 1, wherein the memory unit include instructions that when executed further cause the one or more processors to adaptively configure a number of entries capable of being written to the redundant entry area of the CAM based on one of a set programmable threshold maximum and an adaptable programmable threshold maximum based on past entry replacement history of the CAM.

11. The apparatus of claim 1, wherein the CAM maintains a least-recently used linked list upon which a determination regarding where to write the entry in the redundant entry area of the CAM is based.

12. The apparatus of claim 11, wherein the memory unit includes instructions that when executed further cause the one or more processors to replace a least-recently used entry with the entry to be written to the redundant entry area of the CAM by performing a write-back operation of the entry, the entry being a modified entry.

13. The apparatus of claim 12, wherein the memory unit includes instructions that when executed further cause the one or more processors to replace a least-recently used entry with the entry to be simultaneously written to a redundant entry area of another CAM.

14. The apparatus of claim 11, wherein the memory unit includes instructions that when executed further cause the one or more processors to evict an existing CAM entry in the non-redundant entry area of the CAM.

15. A node controller, comprising:
a first ternary content-addressable memory (TCAM);
a second TCAM;
one or more processors; and
a memory unit operatively connected to the one or more processors, the memory unit including instructions that when executed, cause the one or more processors to:
  receive a coherency directory cache operation request, and determine whether the coherency directory cache operation request involves writing a modified or unmodified entry;
  in response to a determination that the coherency directory cache operation request involves writing a modified entry, writing the entry to each of the first and second TCAMs in corresponding redundant entry areas therein; and
  in response to a determination that the coherency directory cache operation request involves writing an unmodified entry, writing the entry to a non-redundant entry area of only one of the first TCAM or the second TCAM;
wherein each of the first and second TCAMs maintains a least-recently used (LRU) linked list upon which eviction and replacement of entries is determined.

16. The node controller of claim 15, wherein the memory unit includes instructions that when executed further cause the one or more processors to evict an LRU entry in each LRU linked list to accommodate the writing of the modified entry to each of the first and second TCAMs.

17. The node controller of claim 15, wherein the memory unit includes instructions that when executed further cause the one or more processors to evict an LRU entry I either LRU linked list to accommodate the writing of the unmodified entry to the one of the first or second TCAMs.

18. The node controller of claim 15, wherein the memory unit include instructions that when executed further cause the one or more processors to adaptively configure a number of entries capable of being written to the redundant entry areas of the first and second TCAMs based on one of a set programmable threshold maximum and an adaptable programmable threshold maximum based on past entry replacement histories of the first and second TCAMs.

* * * * *